US011479719B2

(12) United States Patent
Liu et al.

(10) Patent No.: US 11,479,719 B2
(45) Date of Patent: Oct. 25, 2022

(54) PEROVSKITE-BASED NANOCRYSTAL SCINTILLATORS

(71) Applicant: NATIONAL UNIVERSITY OF SINGAPORE, Singapore (SG)

(72) Inventors: Xiaogang Liu, Singapore (SG); Qiushui Chen, Singapore (SG)

(73) Assignee: NATIONAL UNIVERSITY OF SINGAPORE, Singapore (SG)

(*) Notice: Subject to any disclaimer, the term of this patent is extended or adjusted under 35 U.S.C. 154(b) by 52 days.

(21) Appl. No.: 17/048,394

(22) PCT Filed: Apr. 18, 2019

(86) PCT No.: PCT/SG2019/050224
§ 371 (c)(1),
(2) Date: Oct. 16, 2020

(87) PCT Pub. No.: WO2019/203737
PCT Pub. Date: Oct. 24, 2019

(65) Prior Publication Data
US 2021/0171828 A1    Jun. 10, 2021

(30) Foreign Application Priority Data
Apr. 19, 2018    (SG) .......................... 10201803272Y

(51) Int. Cl.
*C09K 11/66*    (2006.01)
*C01G 21/00*    (2006.01)
(Continued)

(52) U.S. Cl.
CPC .......... *C09K 11/665* (2013.01); *C01G 21/006* (2013.01); *G01T 1/2006* (2013.01);
(Continued)

(58) Field of Classification Search
CPC .... C09K 11/665; C01G 21/006; G01T 1/2006
See application file for complete search history.

(56) References Cited

U.S. PATENT DOCUMENTS

| 2015/0083923 | A1* | 3/2015 | Stanton | ................... G01T 1/202 250/367 |
| 2018/0196164 | A1* | 7/2018 | Friend | ................... H01L 51/005 |
| 2019/0148143 | A1* | 5/2019 | Bessonov | ......... H01L 21/02601 257/9 |

FOREIGN PATENT DOCUMENTS

KR    20180024947    3/2018

OTHER PUBLICATIONS

D. Gooding et al., Light Yield Perovskite Nanocrystal-Doped Liquid Scintillator, Prepared for Submission to JINST, Jul. 2008, 10 pages.
(Continued)

*Primary Examiner* — Hugh Maupin
(74) *Attorney, Agent, or Firm* — Barnes & Thornburg LLP

(57) ABSTRACT

A nanocrystal scintillator that contains a thin-film layer of perovskite-based quantum dots coated on a substrate layer. The quantum dots each have a formula of $CsPbX_aY_{3-a}$, $CH_3NH_3PbX_3$, or $NH_2CH{=}NH_2PbX_3$, in which each of X and Y, independently, is Cl, Br, or I, and a is 0-3. The substrate layer is an aluminum substrate, a fluoropolymer substrate, a fiber optic plate, a ceramic substrate, or a rubber substrate. Also disclosed are an ionizing radiation detector and an ionizing radiation imaging system containing such a nanocrystal scintillator.

18 Claims, 4 Drawing Sheets

(51) Int. Cl.
  *G01T 1/20* (2006.01)
  *G01T 1/202* (2006.01)
  *B82Y 15/00* (2011.01)
  *B82Y 20/00* (2011.01)
  *B82Y 40/00* (2011.01)

(52) U.S. Cl.
  CPC .............. *G01T 1/2023* (2013.01); *B82Y 15/00* (2013.01); *B82Y 20/00* (2013.01); *B82Y 40/00* (2013.01); *C01P 2002/34* (2013.01); *C01P 2004/64* (2013.01)

(56) References Cited

OTHER PUBLICATIONS

Shen et al., Novel Radioluminescent Nuclear Battery: Spectral Regulation of Perovskite Quantum Dots, Int. J Engergy Res. 2018, 42, 2507-2517, 11 pages.
Yakunin S. et al., Detection of X-ray photons by solution-processed lead halide perovskites, Nature Photonics, dated May 25, 2015, vol. 9, pp. 444-449.
Heo J. H. et al., High-Performance Next-Generation Perovskite Nanocrystal Scintillator for Nondestructive X-Ray Imaging Advanced Materials, dated Aug. 23, 2018, vol. 30, No. 40, pp. 1801743.
Chen Q. et al., All-inorganic perovskite nanocrystal scintillators. Nature, dated Aug. 27, 2018,vol. 561 , pp. 88-93.
International Search Report and Written Opinion for PCT/SG2019/050224 dated Jun. 13, 2019.

\* cited by examiner

PEROVSKITE-BASED NANOCRYSTAL SCINTILLATORS

CROSS REFERENCE TO RELATED APPLICATIONS

This application is a U.S. national stage application under 35 U.S.C. § 371(b) of International Application No. PCT/SG2019/050224 filed Apr. 18, 2019, which claims priority to Singapore Patent Application No. 10201803272Y filed on Apr. 19, 2018, the disclosures of both of which are hereby expressly incorporated by reference in their entirety.

BACKGROUND

Scintillators are luminescent materials that exhibit scintillation when excited by ionizing radiation. They are capable of absorbing high-energy photons and converting the absorbed energy into low-energy visible photons. The rising demand for radiation detection materials has led to intense studies on scintillators for various applications, including radiation exposure monitoring, security inspection, X-ray astronomy, and medical radiography. See Yaffe, M. J. and Rowlands, J. A., *Phys. Med. Biol.*, 1997, 42, 1-39; and Durie, B. G. and Salmon, S. E., *Science*, 1975, 195, 1093-1095.

Traditional scintillators are largely bulk-form crystals (e.g., bulk inorganic scintillators) that contain heavy-atom materials (e.g., $PbWO_4$ and $Bi_4Ge_3O_{12}$). These scintillators, while effective in ionizing radiation scintillation, often exhibit significant limitations, such as low sensitivity to ionizing radiation, radioluminescence afterglow, and non-tunable scintillation. See Nagarkar, V. V. et al., *IEEE T. Nucl. Sci.*, 45, 492-496 (1998); and Baccaro, S. et al., *Nucl. Instrum. Methods in Phys.*, 1995, 361, 209-215. Furthermore, they are typically produced at high temperatures, e.g., 1700° C., conditions requiring costly energy expenditures. See Weber, M. J., *J. Lumin.*, 2002, 100, 35-45.

There is a need to develop a new scintillator for radiation detection without the above-described drawbacks.

SUMMARY

One aspect of the present invention is a nanocrystal scintillator that is capable of generating ionizing-radiation-excited emissions.

The nanocrystal scintillator contains a thin-film layer of perovskite-based quantum dots coated on a substrate layer. The perovskite-based quantum dots each have a formula of $CsPbX_aY_{3-a}$, $CH_3NH_3PbX_3$, or $NH_2CH=NH_2PbX_3$, in which each of X and Y, independently, is Cl, Br, or I, and a is 0-3.

Notably, the substrate layer can be an aluminum substrate, a fluoropolymer substrate (e.g., polytetrafluoroethylene, perfluoroalkoxy alkane, and ethylene tetrafluoroethylene), a fiber optic plate, a ceramic substrate (e.g., silicon nitrate, silicon carbide, alumina, and boron carbide), or a rubber substrate (e.g., ethylene propylene diene methylene rubber, styrene-butadiene rubber, and silicone rubber).

Another aspect of this invention relates to an ionizing radiation detector. The ionizing radiation detector includes the above-described nanocrystal scintillator and a photodetector attached to the substrate layer of the nanocrystal scintillator.

Typically, the photodetector is a photomultiplier tube (PMT) detector, a thin-film transistor (TFT) photodiode sensor, a charge-coupled device (CCD) sensor, a complementary metal-oxide-semiconductor (CMOS) sensor, or an indium gallium zinc oxide (IGZO) TFT sensor.

In certain embodiments, the ionizing radiation detector of this invention unexpectedly responds to radiation at very low dose rates.

Further covered by this invention is an ionizing radiation imaging system, which includes the nanocrystal scintillator described above, a photodetector attached to the substrate layer of the nanocrystal scintillator, and an aluminum film covering the thin-film layer of perovskite-based quantum dots of the nanocrystal scintillator. The photodetector can be one of the photodetectors set forth in the preceding paragraph. Optionally, the ionizing radiation imaging system further includes a digital camera.

The details of the invention are set forth in the description below. Other features, objects, and advantages of the invention will be apparent from the following drawings and detailed description of several embodiments, and also from the appending claims.

DETAILED DESCRIPTION OF THE INVENTION

Figure 1:
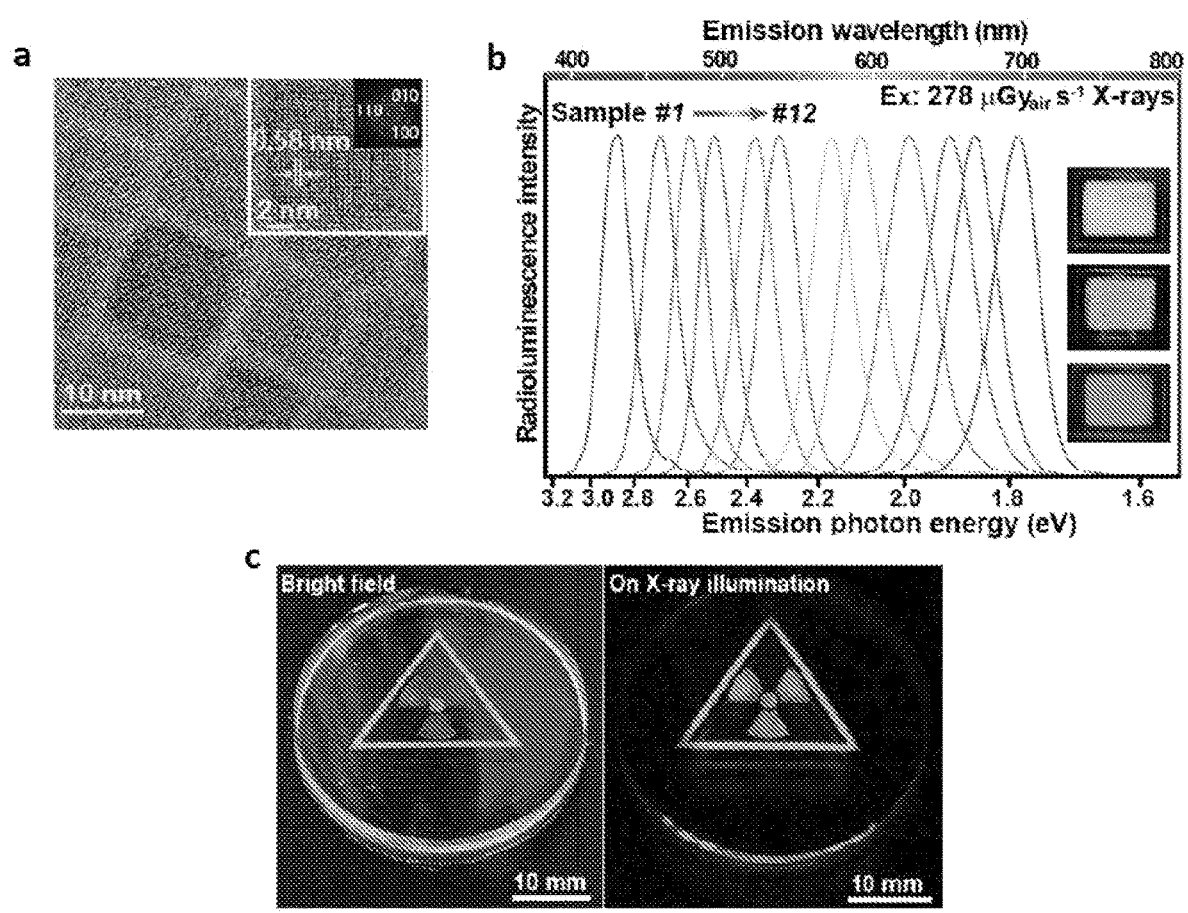
FIG. 1*a* shows a low-resolution transmission electron microscopy (TEM) image of the as-synthesized $CsPbBr_3$ nanocrystals and, in the inset, a high-resolution TEM image of a single $CsPbBr_3$ nanocrystal and its corresponding selected-area electron diffraction pattern taken along the [100] zoom axis.
FIG. 1*b* shows tunable luminescence spectra of 12 perovskite quantum dots, i.e., samples 1-12, under X-ray illumination with a dose rate of 278 $\mu Gy_{air}s^{-1}$ at a voltage of 50 kV.
FIG. 1*c* presents photographs showing multicolored X-ray scintillation (left: bright-field imaging; right: on X-ray illumination at a voltage of 50 kV) through use of three types of perovskite nanocrystals (Orange: $CsPbBr_2I$; Green: $CsPbBr_3$; Blue: $CsPb(Cl/Br)_3$).

Disclosed first in detail herein is a nanocrystal scintillator that generates ionizing-radiation-excited emissions.

To reiterate, the nanocrystal scintillator contains a thin-film layer of perovskite-based quantum dots coated on a substrate layer. The perovskite-based quantum dots each have a formula of $CsPbX_aY_{3-a}$, $CH_3NH_3PbX_3$, or $NH_2CH=NH_2PbX_3$, in which each of X and Y, independently, is Cl, Br, or I, and a is 0-3.

In certain exemplary nanocrystal scintillators, the substrate layer is an aluminum substrate, a fluoropolymer substrate (e.g., polytetrafluoroethylene, perfluoroalkoxy alkane, and ethylene tetrafluoroethylene), a fiber optic plate, a ceramic substrate (e.g., silicon nitrate, silicon carbide, alumina, and boron carbide), a rubber substrate (e.g., ethylene propylene diene methylene rubber, styrene-butadiene rubber, and silicone rubber), or a silicon-based substrate. The "silicon-based substrate" refers to a substrate that contains the silicon element. For example, it can be a polydimethylsiloxane (PDMS) substrate, a silica wafer and a $SiO_2$ film, glass, or a TFT panel containing a pixelated alpha-silicon photodiode array.

In a typical nanocrystal scintillator, the perovskite-based quantum dots each have a formula of $CsPbX_aY_{3-a}$. Examples of the perovskite-based quantum dots include, but are not limited to, $CsPbCl_3$, $CsPbCl_2Br$, $CsPbCl_{1.5}Br_{1.5}$, $CsPbCBr_2$, $CsPbCl_{2.5}Br_{0.5}$, $CsPbBr_3$, $CsPbBr_2I$, $CsPbBr_{1.8}I_{1.2}$, $CsPbBr_{1.5}I_{1.5}$, $CsPbBr_{1.2}I_{1.8}$, $CsPbBrI_2$, and $CsPbI_3$.

Also covered by this invention is an ionizing radiation detector that includes the above-described nanocrystal scintillator and a photodetector attached to the substrate layer of the nanocrystal scintillator. The photodetector can be a PMT detector, a TFT photodiode sensor, a CCD sensor, a CMOS sensor, or an IGZO TFT sensor.

Importantly, the ionizing radiation detector of this invention can respond to radiation at a dose rate of 50 $nGy_{air}s^{-1}$ or lower (e.g., 30 $nGy_{air}s^{-1}$ or lower, 15 $nGy_{air}s^{-1}$ or lower, and 13 $nGy_{air}s^{-1}$).

Still within the scope of this invention is an ionizing radiation imaging system that includes a nanocrystal scintillator described above, a photodetector attached the substrate layer of the nanocrystal scintillator, and an aluminum film covering the thin-film layer of perovskite-based quantum dots of the nanocrystal scintillator. In preferred embodiments, the photodetector is a PMT detector, a TFT photodiode sensor, a CCD sensor, a CMOS sensor, or an IGZO TFT sensor. Optionally, the ionizing radiation imaging system further includes a digital camera.

Without further elaboration, it is believed that one skilled in the art can, based on the above description, utilize the present invention to its fullest extent. The following specific examples are, therefore, to be construed as merely illustrative, and not limitative of the remainder of the disclosure in any way whatsoever. The publications cited herein are incorporated by reference in their entirety.

Example 1: Nanocrystal Scintillators Containing Perovskite-Based Quantum Dots

Synthesis of Cs-Oleate as a Cesium Precursor for Preparing

In a typical procedure, to a two-neck round-bottomed flask (50 mL) were added $Cs_2CO_3$ (0.4 g; 1.23 mmol), oleic acid (OA; 1.25 mL) and octadecene (ODE; 15 mL). The resulting mixture was heated to 100° C. under vigorous stirring and vacuum condition for 0.5 h. Afterwards, a nitrogen purge and vacuum were alternately applied to the flask for three times each to remove moisture and $O_2$. Subsequently, the reaction was heated to 150° C. and the solution became clear, indicating the completion of reaction between $Cs_2CO_3$ and OA. The Cs-solution was kept at 150° C. under a nitrogen atmosphere prior to perovskite nanocrystal synthesis.

Synthesis and Characterization of Perovskite-Based Quantum Dots $CsPbX_3$ perovskite quantum dots were synthesized following a modified hot-injection procedure reported in Swarnkar, A. et al., Science 354, 92-95 (2016).

In a typical experiment, $PbX_2$ (0.36 mmol; x=Cl, Br, or I), oleic acid (1.0 mL), oleylamine (1.0 mL), and ODE (10 mL) were added to a two-neck round bottom flask (50 mL). The resulting mixture was heated to 100° C. with vigorous stirring and under vacuum for 0.5 h, during which moisture was removed by purging with nitrogen and vacuum suction. The mixture was then heated to 160° C. until the $PbX_2$ completely dissolved. A hot Cs-oleate solution (1.0 mL) was quickly injected into the reaction mixture. After 5 s of reaction, the flask was transferred into an ice bath. $CsPbX_3$ quantum dots were obtained by centrifugation at 13000 rpm for 10 min and stored in 4 mL of cyclohexane prior to further use.

Twelve samples having different halide compositions were prepared, i.e., $CsPbCl_3$ (sample 1), $CsPbCl_2Br$ (sample 2), $CsPbCl_{1.5}Br_{1.5}$ (sample 3), $CsPbClBr_2$ (sample 4), $CsPbCl_{2.5}Br_{0.5}$ (sample 5), $CsPbBr_3$ (sample 6), $CsPbBr_2I$ (sample 7), $CsPbBr_{1.8}I_{1.2}$ (sample 8), $CsPbBr_{1.5}I_{1.5}$ (sample 9), $CsPbBr_{1.2}I_{1.8}$ (sample 10), $CsPbrI_2$ (sample 11), and $CsPbI_3$ (sample 12). Note that the samples containing mixed-halides were readily obtained by using appropriate ratios of different $PbX_2$ salts.

The nanocrystals were characterized by TEM imaging using a FEI Tecnai G20 transmission electron microscope with an accelerating voltage of 200 kV and by powder X-ray diffraction using an ADDS wide-angle X-ray powder diffractometer with CuKα radiation ($\lambda=1.54184$ Å). An exemplary TEM image is shown in FIG. 1a, which reveals a cubic shape of the as-synthesized quantum dots, which have an average size of 9.6 nm. The inset of FIG. 1a shows a high resolution image of a $CsPbBr_3$ quantum dot and its X-ray diffraction pattern taken along the [100] zoom axis.

A study was conducted to investigate the possibility of using the perovskite quantum dots for multicolored X-ray scintillation. More specifically, radioluminescence of solid nanocrystal films (10 mm) formed from samples 1-12 was measured using an Edinburgh FS5 fluorescence spectrophotometer (Edinburgh Instruments Ltd., UK) equipped with a miniature X-ray source (AMPEK, Inc.). Four commercial bulk scintillators, i.e., CsI:Tl, $PbWO_4$, $YAlO_3$:Ce, and $Bi_4Ge_3O_{12}$ were included in this study for comparison. Remarkably, as shown in FIG. 1b and Table 1 below, the nanocrystal films exhibited emission peaks with small full-width-half-maximum (FWHM) values ranging from 12 nm to 40 nm and emission maxima ranging from 410 nm to 700 nm. By contrast, radioluminescence of the four conventional bulk scintillators was invariable, and exhibited a wide emission peaks with a large value of full-width-at-half-maximum (FWHM) (Table 1). Further, sensitivity of a $CsPbBr_3$ nanocrystal thin film to X-ray illumination was compared to that of the four commercial bulk scintillators. It was found that, at a low-irradiation dose of 5.0 $\mu Gy_{air}$ s$^{-1}$ (10 kV, 5 μA), the ability of the $CsPbBr_3$ nanocrystal thin film (thickness: ~0.1 mm) to convert X-ray photons into visible luminescence was comparable to that of CsI:Tl and far superior to that of $PbWO_4$, $YAlO_3$:Ce, and $Bi_4Ge_3O_{12}$ (Table 1). This superior performance of the $CsPbBr_3$ nanocrystals was attributed to large X-ray stopping power and high emission quantum yields of the Pb-halide quantum dots.

These results indicate that the perovskite-based quantum dots described herein are particularly suitable for achieving high-efficiency, multicolored X-ray scintillation.

TABLE 1

Scintillation characteristics for different types of materials

| Material | Emission Maximum (nm) | FWHM (nm) | Thickness (mm) | Emission Intensity (au) | Decay Time (ns) |
|---|---|---|---|---|---|
| CsPbX$_3$ (QDs) | 410-700 | 12-40 | 0.1 | 100 | 44.6 |
| CsI:Tl (bulk) | 565 | 155 | 5.0 | 185 | 1000 [a] |
| Bi$_4$Ge$_3$O$_{12}$ (bulk) | 490 | 160 | 3.0 | 7.0 | 300 [a] |
| YAlO$_3$:Ce (bulk) | 380 | 55 | 0.6 | 19.4 | 10$^2$-10$^4$ [a] |
| PbWO$_4$ (bulk) | 440 | 120 | 5.0 | 0.35 | 10$^2$-10$^4$ [a] |

[a] See Niki, M., *Meas. Sci. Technol.*, 2016, 17, 37-54.

Fabrication of Nanocrystal Scintillators Containing Perovskite-Based Quantum Dots Flexible nanocrystal scintillators were prepared by a combination of solution processing and a standard soft lithography microfabrication technique.

Briefly, a photomask was first designed using Adobe Illustrator CS6. A negative photoresist having a thickness of 60 μm was then spin-coated (SU-8 2015, 2500 rpm, 60 s) onto a silicon wafer (3 in.), which was prebaked at 60° C. for 10 min and then 85° C. for 5 min. Subsequently, the silicon wafer was placed under a UV lamp for 20 s and subjected to post-baking treatment in an oven at 75° C. for 5 min. Next, the desired microstructure on the silicon wafer was produced using a developer solution. A PDMS substrate was fabricated on the silicon wafer with a premixed PDMS prepolymer and curing agent (10:1 by mass) under vacuum condition, subjected to heat treatment at 80° C. for 2 h, then carefully peeled off the silicon wafer. Finally, a dispersion of perovskite quantum dots in cyclohexane was spin-coated onto the PDMS substrate to form a thin film, thereby obtaining a nanocrystal scintillator.

FIG. 1c shows an exemplary scintillator prepared through the procedure described above. Notably, this scintillator exhibited multicolored X-ray induced emission due to use of three different perovskite nanocrystals, i.e., CsPbBr$_2$I (orange), CsPbBr$_3$ (green), and CsPb(Cl/Br)$_3$ (blue).

Example 2: Fabrication of an X-Ray Photoconductor Containing a Nanocrystal Scintillator An X-ray photoconductor (FIG. 2a) was constructed to experimentally confirm the presence of X-ray-induced charge carriers in CsPbBr$_3$ quantum dots in a nanocrystal scintillator.

To construct the X-ray photoconductor, a substrate consisting of a silicon wafer with a SiO$_2$ layer (300 nm) was first cleaned by sonication in acetone, in ethanol, then in deionized water. After drying with flowing nitrogen, the substrate was treated with oxygen plasma for 6 min. A solution of CsPbBr$_3$ quantum dots in cyclohexane was then spin-coated onto the substrate at 500 rpm for 30 s and annealed at 100° C. for 5 min. This procedure was repeated for 3 times to produce a nanocrystal film having a thickness of ~10 μm. Subsequently, gold electrodes with a thickness of 100 nm were deposited onto the CsPbBr$_3$ quantum dot film by thermal evaporation. A shadow mask was used to control the size of the gold electrodes.

The current-voltage characteristics of the X-ray photoconductor were then determined with and without X-ray illumination. A commercially available, miniaturized X-ray tube (Amptek) was used for X-ray photon-to-current measurements. The target in the X-ray tube was made of gold and the maximum output was 4 W. The voltage was kept at 50 kV while the peak X-ray energy was set at 10 keV with an Al/W filter and 2-mm-diameter brass collimator. The distance between the X-ray source and the X-ray photoconducting device was about 30 cm. The current-voltage measurement of the X-ray photoconductor was performed using a Signotone Micromanipulator S-1160 probe station equipped with a Keithley 4200 Semiconductor Parametric Analyzer. All experiments were carried out under ambient conditions.

Figure 2:
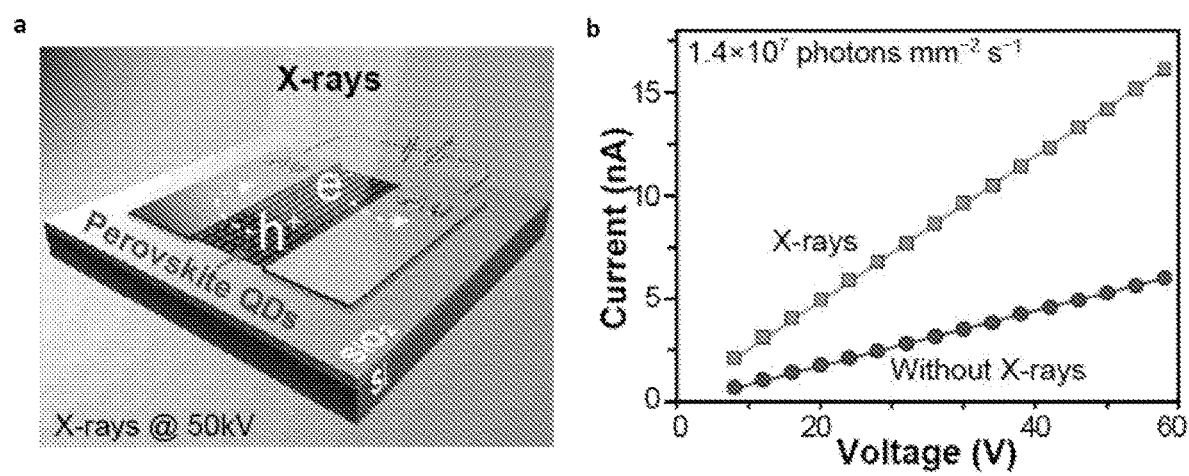
FIG. 2*a* is a schematic showing the basic design of a perovskite quantum dot-based photoconductor used for X-ray sensing.
FIG. 2*b* is a current-voltage plot of a perovskite quantum dot-based photoconductor recorded with and without X-ray illumination.

As shown in FIG. 2b, the current through the X-ray photodetector was higher with X-ray illumination, which confirmed the presence of X-ray induced charge carriers in CsPbBr$_3$ quantum dots.

Example 3: Fabrication and Characterization of an X-Ray Detector Containing a Nanocrystal Scintillator An ultrasensitive X-ray detector (inset of FIG. 3a) containing a nanocrystal scintillator was constructed by (i) spin-coating a dispersion of CsPbBr$_3$ quantum dots in cyclohexane onto a PDMS substrate and (i) coupling the PDMS substrate to a PMT detector.

Performance of this X-ray detector was determined by exposing it to X-ray photons at a range of dose rates (0.013-278 μGy$_{air}$ s$^{-1}$), which was controlled by adjusting the current and voltage of the X-ray source.

Figure 3:
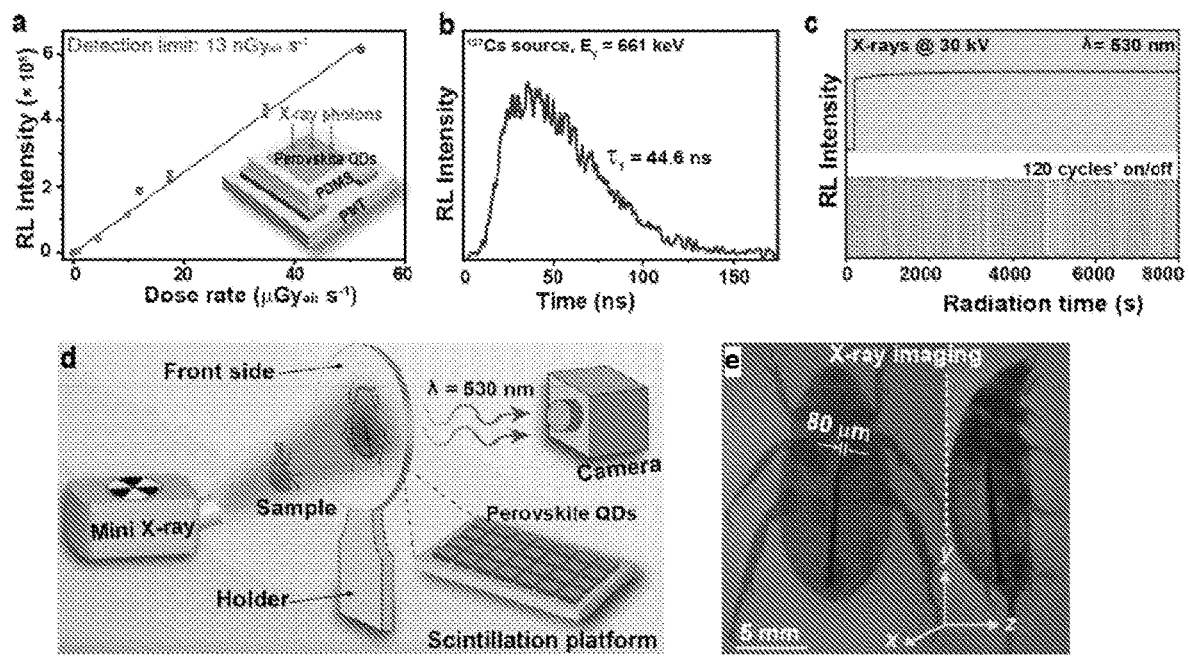
FIG. 3*a* is a plot of radioluminescence (RL) intensity versus dose rate of a $CsPbBr_3$-based scintillator, a schematic of which is shown in the inset.
FIG. 3*b* is a plot of RL intensity of the $CsPbBr_3$-based scintillator under excitation by a $^{137}Cs$ source.
FIG. 3*c* is a plot of RL intensity of the $CsPbBr_3$-based scintillator against continuous irradiation and repeated cycles of excitation.
FIG. 3*d* is a schematic of an experimental set-up for real-time, X-ray diagnostic imaging.
FIG. 3*e* is an X-ray phase contrast image of a beetle implanted with a needle, recorded with a digital camera.

As shown in FIG. 3a, the X-ray detector exhibited a linear response to X-ray dose rate. Unexpectedly, it detected X-ray photons at a low dose rate of 13 nGy$_{air}$ s$^{-1}$, which was 420 times lower than the dose threshold of medical radiation typically required for X-ray diagnostics (5.5 μGy$_{air}$ s$^{-1}$). This X-ray detector also exhibited a short scintillation decay time (i) of 44.6 ns upon excitation with pulsed photons (661 keV) generated by a portable $^{137}$Cs source (FIG. 3b), indicating a very fast response to X-rays photons and minimal afterglow luminescence. This short scintillation decay time of the X-ray detector compares favorably to those of commercial bulk scintillators CsI:Tl, PbWO$_4$, YAlO$_3$:Ce, and Bi$_4$Ge$_3$O$_{12}$, which exhibit scintillation decay times ranging from 300 ns to 10,000 ns (Table 1).

Photostability of the perovskite quantum dots in the X-ray detector was further examined under continuous or repeated cycles (120 cycles; excitation time interval=30 s) of X-ray illumination (FIG. 3c). It was found that X-ray induced radioluminescence did not decrease with increasing illumination time or illumination cycles, which indicated the perovskite quantum dots in the X-ray detector were stable towards X-ray photons.

In sum, the X-ray detectors of this invention are unexpectedly sensitive and exhibit very fast response to X-ray photons. Further, due to the perovskite nanocrystals being photostable, performance of these X-ray detectors does not deteriorate under X-ray illumination.

Example 4: X-Ray Phase Contrast Imaging Using a Nanocrystal Scintillator

A study was conducted to assess the suitability of nanocrystals scintillators of this invention for X-ray phase contrast imaging.

First, a green scarab beetle was implanted with a metallic needle. Subsequently, the beetle was placed between an X-ray source and a nanocrystal scintillator, which included a thin film layer of CsPbBr$_3$ quantum dots coated on a plastic disk (FIG. 3d). X-ray images were then recorded at a voltage of 50 kV. Note that the CsPbBr$_3$ nanocrystals were chosen for this study because their green emission at 530 nm matched well with the maximum wavelength response of a CMOS sensor.

As shown in FIG. 3e, due to a large difference in X-ray stopping power, the needle inside the beetle was clearly revealed in a phase contrast image, which was conveniently recorded with a conventional digital camera.

The results of this study demonstrate that nanocrystal scintillators of this invention can be readily used for direct X-ray contrast imaging.

Example 5: Preparation and Characterization of a Flat-Panel X-Ray Imaging System Containing a Nanocrystal Scintillator Studies were conducted to test the compliance of the perovskite nanocrystals to a commercial flat-panel X-ray imaging system (iRAY Technology Shanghai, Inc.) equipped with α-Si photodiode arrays (FIG. 4a).

Briefly, a dispersion of CsPbBr$_3$ nanocrystals in cyclohexane was spin-coated on the photodiode arrays (8.0×8.0 cm) to form a thin film (75 µm). After evaporation of cyclohexane, an aluminum film (40 µm) was added under vacuum, in a similar packaging process to that of CsI:Tl-based commercial X-ray imaging system. The aluminum film was used to protect the scintillators against moisture and light soaking. Note that a reflecting layer was coated on the surface of the aluminum film to enhance the light collection into the photodiode elements.

The X-ray imaging system was used to image the internal structures of electronic circuits (FIG. 4b) and an iPhone (FIG. 4c) with a low X-ray dose of 15 µGy$_{air}$ (2.5 mGy$_{air}$ s$^{-1}$ X-ray exposure for 6 ms). The power consumption was 25 W for full image acquisition. The X-ray source was operated at a voltage of 70 kV. The spatial resolution of the X-ray imaging system was determined by measurement of its modulation transfer function (MTF).

Figure 4:
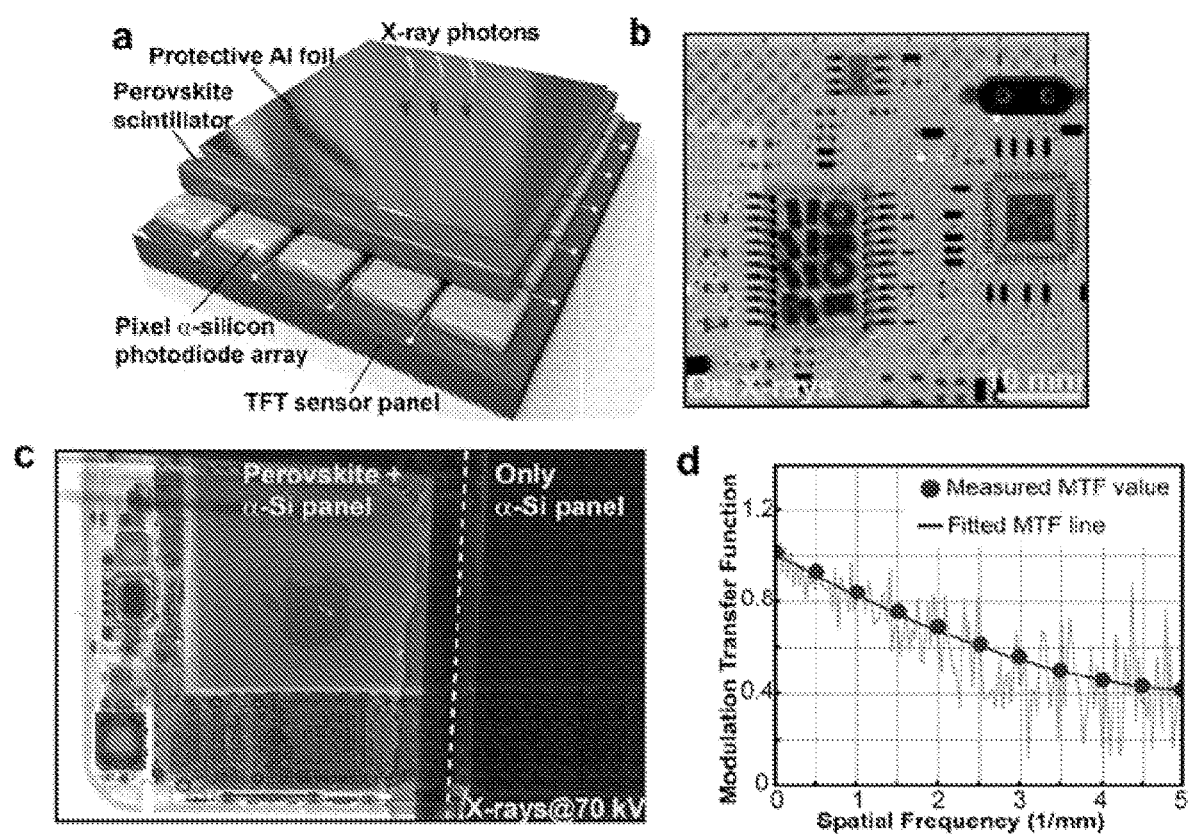
FIG. 4*a* is a schematic of a flat-panel X-ray imaging system consisting of a thin-film transistor (TFT) sensor panel, a pixelated α-silicon photodiode array, a $CsPbBr_3$ perovskite nanocrystal thin film, and a protective cover of aluminum foil.
FIG. 4*b* is an X-ray image of a network interface card obtained using the flat panel imaging system.
FIG. 4*c* is an X-ray image of an iPhone acquired with and without the perovskite scintillators deposited on the α-Si photodiode panel of the flat-panel X-ray imaging system.
FIG. 4*d* is a plot of modulation transfer function versus spatial frequency for the flat-panel X-ray imaging system.

As shown in FIG. 4d, the X-ray imaging system exhibited a modulation transfer function of 0.72 at 2.0 line pairs per millimeter (lp/mm), a spatial resolution that was much higher than commercially used CsI:Tl-based flat-panel X-ray detectors (0.36 at 2.0 lp/mm). This unexpectedly high spatial resolution was ascribed to a lower degree of light scattering in the nanoparticle-based thin film.

In view of these results, it is clear that the X-ray imaging system of this invention is ideal for dynamic real-time X-ray imaging.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Further, from the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. An ionizing radiation detector, comprising:
   (a) a nanocrystal scintillator comprising a thin-film layer of perovskite-based quantum dots coated on a substrate layer, wherein the perovskite-based quantum dots each have a formula of CsPbX$_a$Y$_{3-a}$, CH$_3$NH$_3$PbX$_3$, or NH$_2$CH=NH$_2$PbX$_3$, in which each of X and Y, independently, is Cl, Br, or I, and a is 0-3; and the substrate layer is an aluminum substrate, a fluoropolymer substrate, a fiber optic plate, a ceramic substrate, or a rubber substrate; and
   (b) a photodetector attached to the substrate layer of the nanocrystal scintillator,
   wherein the ionizing radiation detector has a reusability of at least 120 cycles.

2. The ionizing radiation detector of claim 1, wherein the perovskite-based quantum dots each have a formula of CsPbX$_a$Y$_{3-a}$.

3. The ionizing radiation detector of claim 2, wherein the substrate layer is a fluoropolymer substrate formed of polytetrafluoroethylene, perfluoroalkoxy alkane, or ethylene tetrafluoroethylene.

4. The ionizing radiation detector of claim 2, wherein the substrate layer is a ceramic substrate formed of silicon nitrate, silicon carbide, alumina, or boron carbide.

5. The ionizing radiation detector of claim 2, wherein the substrate layer is a rubber substrate formed of ethylene propylene diene methylene rubber, styrene-butadiene rubber, or silicone rubber.

6. The ionizing radiation detector of claim 2, wherein the perovskite-based quantum dots each have a formula of CsPbX$_a$Y$_{3-a}$ is selected from CsPbCl$_3$, CsPbCl$_2$Br, CsPbCl$_{1.5}$Br$_{1.5}$, CsPbClBr$_2$, CsPbCl$_{2.5}$Br$_{0.5}$, CsPbBr$_3$, CsPbBr$_2$I, CsPbBr$_{1.8}$I$_{1.2}$, CsPbBr$_{1.5}$I$_{1.5}$, CsPbBr$_{1.2}$I$_{1.8}$, CsPbBrI$_2$ and CsPbI$_3$.

7. The ionizing radiation detector of claim 1, wherein the photodetector is a photomultiplier tube (PMT) detector, a thin-film transistor (TFT) photodiode sensor, a charge-coupled device (CCD) sensor, a complementary metal-oxide-semiconductor (CMOS) sensor, or an indium gallium zinc oxide (IGZO) TFT sensor.

8. The ionizing radiation detector of claim 1, wherein the ionizing radiation detector responds to radiation at a dose rate of 50 nGy$_{air}$s$^{-1}$ or lower.

9. The ionizing radiation detector of claim 1, wherein the ionizing radiation detector responds to radiation at a dose rate of 15 nGy$_{air}$s$^{-1}$ or lower.

10. The ionizing radiation detector of claim 1, having an emission peak with full-width-half-maximum (FWHM) of about 12 nm to about 40 nm.

11. The ionizing radiation detector of claim 1, having an emission maxima of about 410 nm to about 700 nm.

12. The ionizing radiation detector of claim 1, having a thickness of about 10 µm to about 100 µm.

13. The ionizing radiation detector of claim 1, having an emission intensity of at least about 100 au relative to CsI:Tl (bulk) which has an emission intensity of about 185 au.

14. The ionizing radiation detector of claim 1, having a decay time of less than about 50 ns.

15. The ionizing radiation detector of claim 1, wherein the perovskite-based quantum dots is a combination of CsPbBr2I, CsPbBr3 and CsPb(Cl/Br)3.

16. An ionizing radiation imaging system, comprising an ionizing radiation detector of claim 1 and an aluminum film covering the thin-film layer of perovskite-based quantum dots of the nanocrystal scintillator, wherein the ionizing radiation imaging system has a modulation transfer function of about 0.7 at 2 line pairs per millimeter (lp/mm).

17. The ionizing radiation imaging system of claim 16, further comprising a digital camera.

18. A method of fabricating an ionizing radiation detector, comprising:
(a) synthesising perovskite-based quantum dots each have a formula of $CsPbX_aY_{3-a}$, $CH_3NH_3PbX_3$, or $NH_2CH=NH_2PbX_3$, in which each of X and Y, independently, is Cl, Br, or I, and a is 0-3;
(b) coating the perovskite-based quantum dots on a substrate layer, the substrate layer is an aluminum substrate, a fluoropolymer substrate, a fiber optic plate, a ceramic substrate, or a rubber substrate; and
(c) attaching a photodetector to the substrate layer of the nanocrystal scintillator;
wherein in the synthesis step, a Pb precursor, and Cs, $CH_3NH_3$, or $NH_2CH=NH_2$ precursors are added at a Pb: Cs, $CH_3NH_3$, or $NH_2CH=NH_2$ mole ratio of about 2:1 to about 2.5:1; and
wherein the ionizing radiation detector has a reusability of at least 120 cycles.

* * * * *